United States Patent [19]

Biem

[11] Patent Number: 4,934,217
[45] Date of Patent: Jun. 19, 1990

[54] POWER TRANSMISSION APPARATUS AND METHODS OF CONSTRUCTING AND UTILIZING SAME

[76] Inventor: Igor Biem, 29760 Fall River, Southfield, Mich. 48076

[21] Appl. No.: 383,609

[22] Filed: Jul. 24, 1989

[51] Int. Cl.$^5$ .............................................. F16H 21/20
[52] U.S. Cl. ......................................... 74/837; 74/88; 74/834
[58] Field of Search ............... 74/828, 831, 834, 835, 74/836, 837, 838, 88

[56] References Cited

U.S. PATENT DOCUMENTS

| | | | |
|---|---|---|---|
| 3,085,452 | 4/1963 | Thompson | 74/88 X |
| 3,312,112 | 4/1967 | Draganti | 74/88 |
| 4,062,246 | 12/1977 | Lukawsky | 74/88 |
| 4,182,203 | 1/1980 | Drury | 74/834 |
| 4,565,105 | 1/1986 | Peterson | 74/834 X |
| 4,622,793 | 11/1986 | Oki | 74/837 X |

FOREIGN PATENT DOCUMENTS

| | | | |
|---|---|---|---|
| 1027307 | 5/1953 | France | 74/831 |
| 52-19865 | 2/1977 | Japan | 74/834 |

Primary Examiner—Allan D. Herrmann
Assistant Examiner—Janice E. Chartoff
Attorney, Agent, or Firm—Irving M. Weiner; Joseph P. Carrier; Robert M. Petrik

[57] ABSTRACT

A multiple speed ratio power transmission apparatus, comprises input mechanism adapted to be connected to a power source for being driven with a constant reciprocating or oscillating motion, output mechanism including a rotatable output shaft, motion transmitting mechanism for controllably coupling the input mechanism to the output means, the motion transmitting means including an energy connecting element drivably connected to the input mechanism so as to be driven into a reciprocating or oscillating motion with a selectively, discretely variable stroke $S=NS_{min}$, where $S_{min}$ is an increment of movement of the energy connecting element corresponding to one complete motion of the input mechanism and $N=1,2,3$, etc. indicating a selectively variable number of complete motions of the input mechanism, the energy connecting element being drivably connected to the output shaft for driving the output shaft through 180° rotation with each selected stroke S thereof, the motion transmitting mechanism being adapted to move in either of opposite directions when the input mechanism is in deadpoints of its motion and deadpoints in the reciprocating or oscillating motion of the energy connecting element being synchronized with the deadpoints in the motion of the input mechanism, and speed ratio change mechanism operatively associated with the motion transmitting mechanism for selectively, discretely varying the stoke S of the energy connecting element to thereby change a speed ratio between the motion of the input mechanism rotation of the output shaft.

13 Claims, 2 Drawing Sheets

4,934,217

POWER TRANSMISSION APPARATUS AND METHODS OF CONSTRUCTING AND UTILIZING SAME

BACKGROUND OF THE INVENTION

1. Field of The Invention

The present invention pertains to power transmission apparatus for transmitting mechanical power. More particularly, the present invention relates to multiple speed ratio power transmission apparatus, such as the power transmissions used on motor vehicles.

2. Description of the Relevant Art

There are many known transmissions for transmitting mechanical power, including many transmissions which can provide different speed ratios between an input motion and an output motion. For example, all motor vehicles are provided with such multiple speed ratio transmissions for transmitting rotative power from an engine to a vehicle's drive wheels. In such known transmission apparatus a provision for obtaining a plurality of driving speed ratios is normally made through selecting a different torque transmitting path for each speed ratio. Further, an execution of selecting the various speed ratios is accomplished through an engaging-disengaging process involving some type of clutch mechanism such as power friction clutches, synchronizers, manual couplers. As will be understood, the complexity of known multiple speed transmission apparatus is directly related to the number of speed ratios desired.

Additionally, there are known constant-variable transmissions (CVTs) which have a single torque transmitting path, but the known CVTs also include friction elements (such as CVT pulleys) for transferring torque.

The present invention has been developed to provide a multiple speed ratio transmission device which, in contrast to the known transmission devices, is relatively simple and compact.

SUMMARY OF THE INVENTION

It is an object of the present invention to provide a compact, multiple speed ratio transmission device which transmits mechanical power from an input member to an output shaft through a single torque transmitting path for every speed ratio using continuously engaged torque transmitting elements, and without using conventional "friction" elements.

It is another object of the present invention to provide such a transmission device which is very simple in construction for reduced manufacturing and maintenance costs.

Still another object of the present invention is to provide such a transmission apparatus which can be automatically controlled in relation to any desired external factor, such as vehicle speed.

According to the present invention there is provided a multiple speed ratio power transmission apparatus comprising input means adapted to be connected to a power source for being driven with a constant reciprocating or oscillating motion, output means including rotatable output shaft, motion transmitting means for controllably coupling the input means to the output means, the motion transmitting means including an energy connecting element drivably connected to the input means so as to be driven into a reciprocating or oscillating motion with a selectively, discretely variable stroke $S = NS_{min}$, where $S_{min}$ is an increment of movement of the energy connecting element corresponding to one complete motion of the input means and $N = 1,2,3$, etc. indicating a selectively variable number of complete motions of the input means, the energy connecting element being drivably connected to the output shaft for driving the output shaft through 180° rotation with each stroke S thereof, the motion transmitting mans being adapted to move in either of opposite directions when the input means is in deadpoints of its motion and deadpoints in the reciprocating or oscillating motion of the energy connecting element being synchronized with the deadpoints in the motion of the input means; and speed ratio change means operatively associated with the motion transmitting means for selectively, discretely varying the stoke S of the energy connecting element to thereby change a speed ratio between the motion of the input means and rotation of the output shaft.

DETAILED DESCRIPTION OF THE PREFERRED EMBODIMENT

Figure 1:
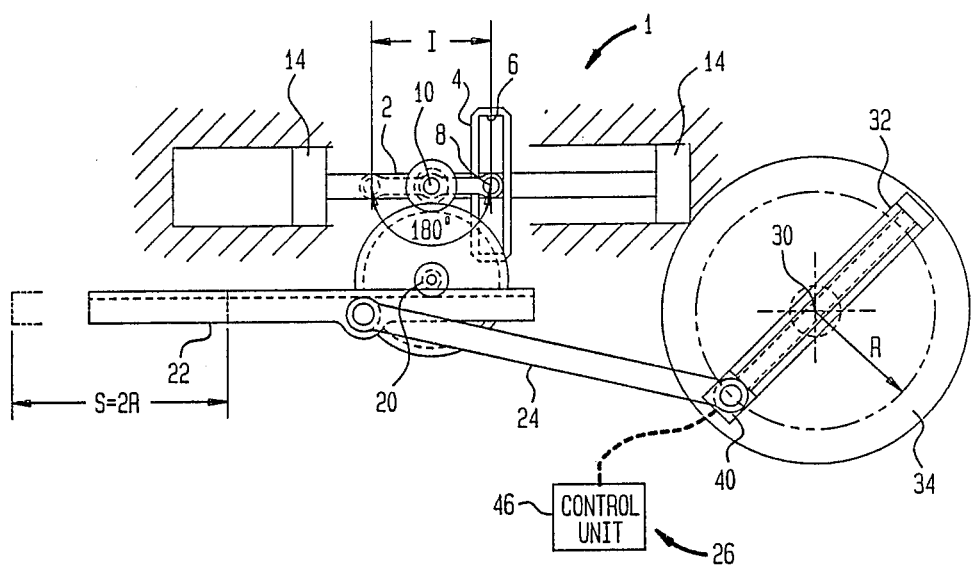
FIG. 1 is a schematic view of a power transmission apparatus according to a preferred embodiment of the present invention.
Figure 2:
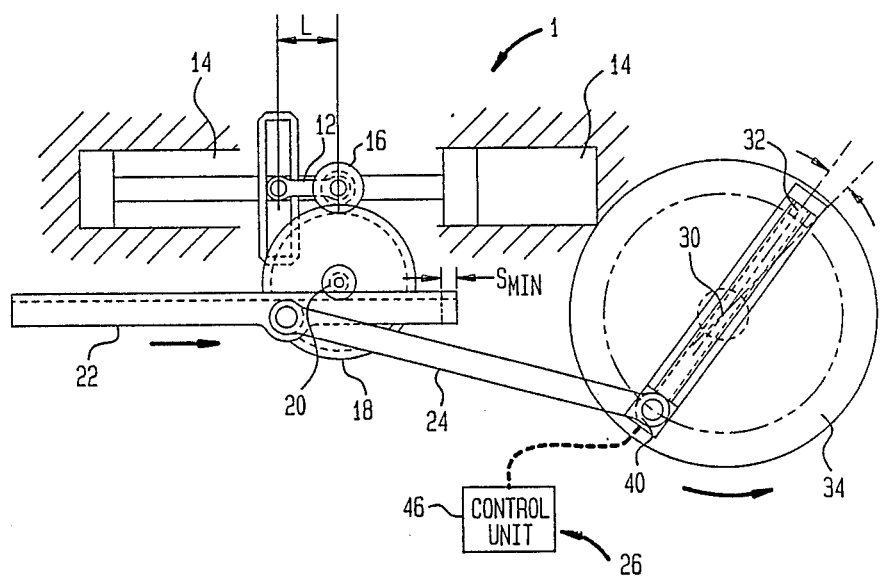
FIG. 2 is substantially identical to FIG. 1 except that the transmission apparatus has been advanced by one complete motion of an input means thereof.

Referring to FIGS. 1 and 2, a power transmission apparaturs according to the present invention is indicated at 1. The apparatus 1 generally includes an input means adapted to be connected to a power source, such as an internal combustion engine, for being driven with a constant, reciprocating or oscillating, input motion at a first speed (which can be variable or constant); an output means for conveying an output motion at a second speed (which can also be variable or constant) proportional to the first speed; a motion transmitting means drivably connected to the input means in such a manner that when the input means is in a dead point position thereof the motion transmitting means can move in either of opposite directions (such as clockwise or counterclockwise), and which converts the constant input motion of the input means into a selectively, discretely variable stroke for driving the output means; and a speed ratio change means for selectively, discretely changing the ratio between the first speed and the second speed.

More particularly, the input means of the apparatus 1 includes a rail or rod 2 which is drivably connected to the power source so as to be reciprocated with a constant stroke I by the power source. For simplicity's sake the power source in FIGS. 1-2 is depicted as a pair of pistons 14 for example of an inernal combustion engine, provided at oppostie ends of the rail 2. It will be understood, however, that any power source capable of moving the rail 2 with a constant reciprocating or oscillating stroke could be used in the present invention.

The motion transmitting means includes a scotch yoke 4 fixed to the rail 2 for being reciprocated therewith and having a slot 6 defined therein in perpendicular relation to the longitudinal axis of rail 2, a pin 8 freely sliding in the slot 6 and having a crank arm 12 and an intermediate crank shaft 10 connected thereto for being rotated by reciprocating movements of the rail 2, a first gear 16 mounted about the intermediate crank shaft 10 so as to rotate therewith, a second gear 18 driven by the first gear, a pinion 20 which rotates together with the second gear 18, a sliding rack or energy connecting element 22 which is driven by the pinion 20 with a stroke which could be selectively varied with a selectively, discretely variable length of a crank arm 32 of the output means, as discussed herein-below, and a connecting rod 24 pivotally connected between the sliding rack 22 and the crank arm 32 of the output means for driving the crank arm.

Note that the crank arm of the intermediate crank shaft 10 will be perpendicular to the slot 6 whenever the sliding rail 2 is in a dead point position thereof at the end of a stroke I in either direction so that the intermediate crank shaft 10 will be rotated either clockwise or counter clockwise by the next stroke of the sliding rail 2. This feature is necessary for achieving uni-directional movement of the output shaft 30 of the output means, as discussed more fully below. The crank arm 12 has a radius $L = I/2$ so that the intermediate crank shaft 10 will always be rotated by exactly 180° for each complete stroke I of the sliding rail 2.

The output means according to the first embodiment of the present invention includes the rotatable output shaft 30, a crank arm 32 mounted about the output shaft 30 and which is driven by the motion transmitting means for rotating the output shaft 30, and a flywheel 34 also mounted about the output shaft 30 for rendering rotation of the output shaft 30 steady and uni-directioinal.

Also in this regard, it is again very important that movements of the output means be carefully arranged and controlled, or synchronized, together with movements of the input means and the motion transmitting means. More particularly, it is important that the two points of the crank arm 32 (a 0° position and a 180° position) corresponding to end positions of the sliding rack 22 as it completes strokes in forward and referse directions, occur precisely as the intermediate crank shaft 10 completes its 180° rotation and the crank shaft 10 could be rotated in either direction by the next stroke of the sliding rail 2. Such synchronization between the input means, the output means and the motion transmitting means assures smooth, reliable transmission of power from the input means to the output means, and together with the flywheel 34 assures unidirectional movement of the output shaft 30.

The speed ratio change means according to this preferred embodiment of the invention functions by selectively, discretely changing the effective length of a crank radius R of the crank arm 32 of the output means and generally includes: a radially adjustable pivotal coupling 40 between one end of the connecting rod 24 and the crank arm 32; and a means 26 for selectively, discretely moving the pivotal coupling radially along the crank arm 32 for discretely adjusting the effective length of the crank arm 32. Such means 26 will, for example, include a hydraulic system (not shown) such as that disclosed in U.S. Pat. No. 4,757,724 for selectively, discretely moving the pivotal coupling 40 along the crank arm 32 and a control unit 46, such as a microprocessor, for controlling the hydraulic system in a predetermined manner. As disclosed in U.S. Pat. No. 4,757,724, the hydraulic system will include a fluid driven actuator which is moved along the radial length of a rotating arm (crank arm 32 in the present invention) by fluid pressure of the hydraulic system, with hydraulic fluid entering a conduit in the rotating arm at a central, pivot position of the arm (corresponding to the position of the rotatable output shaft 30 in the present invention). The actuator, in turn, will be connected to the pivotal coupling 40 so that the coupling will discretely move with the actuator. Further, the control unit 46 will preferably receive at least one input signal indicative of an external factor, such as a vehicle's speed or the speed of rotation of an engine crank shaft, from one or more sensors (not shown) and will send an appropriate energizing signal to the hydraulic system for discretely adjusting the position of the pivotal coupling 40 in a predetermined manner. Thus, for example, if the sensed external condition were vehicle speed, the control 46 would have stored in a memory array thereof data pertaining to predetermined, appropriate output signal values corresponding to predetermined appropriated positions of the pivotal coupling 40, and the input signal indicative of sensed vehicle speed would be used as address for selecting the appropriate output signal from the array, which output signal would then be outputed by the control unit 46 as an actuation signal for the hydraulic system.

OPERATION OF THE FIRST EMBODIMENT

In operation, each constant stroke I of the sliding rail 2 is converted to an angular displacement of 180° of the intermediate crank shaft 10 through the crank pin 8 freely sliding in the slot 6 of the scotch yoke 4 as discussed above. The angular displacement of the intermediate crank shaft 10 drives the sliding rack 22 with a full stroke S always equal to 2R, where R is the selectively, discretely adjustable crank radius of the crank arm 32 of the output means, so that one cycle of the sliding rack 22 (a full stroke in one direction and a return stroke in the opposite direction) always drives the output shaft 30 through one full rotation or 360°. According to a primary aspect of the present invention, the motion transmitting means will be carefully sized and controlled, together with the input means, the output means and the speed ratio change means, so that the motion transmitting means will drive the output shaft 30 through exactly 180° for N complete strokes I of the sliding rail 2, where N=1,2,3, etc. In other words, the motion transmitting means will drive the output shaft through one complete rotation for N complete cycles (one cycle including a first stroke in a first direction and a return stroke in the opposite direction) of the sliding rail 2. Correspondingly, the discretely adjustable length of the crank radius R of the crank arm 32 will always be equal to a multiple of a base length $R_{inc}$ such that $R = NR_{inc}$, and the length of the variable stroke S of the sliding rack 22 will always be equal to a multiple of a base length Smin such that $S = NS_{min}$.

In this regard, a single stroke of the sliding rail 2 (corresponding to 180° rotation of the intermediate crankshaft 10) will always move the sliding rack 22 by a given increment Cp/2M, where Cp is the pitch circle circumference of the pinion 20 and M is the ratio of the second gear 18 to the first gear 16. Considering such increment size together with the fact that S=2R as discussed above, it will be understood that S and R are both directly related to such increment size. For example, if a minimum value of R, $R_{min}$, is set equal to $R_{inc}$ of the crank shaft 32 and $R_{min}$ is equal to Cp/2M, then $S_{min}$ of the sliding rack 22 must be set equal to 2 $R_{inc}$ or Cp/M. With R and S set to their minimum values $R_{min}$, $S_{min}$ the output shaft 30 will be rotated 180° by two complete strokes of the sliding rail 2, which moves the sliding rack 22 through one complete stroke $S=S_{min}$ and the speed ratio between speeds of the intermediate crank shaft 10 and the output shaft 30 is two because the output shaft 30 rotates 360° for 720° of rotation of intermediate crank shaft 10 (the intermediate crank shaft is rotated 360° in a first direction and then rotated 360° in the opposite direction).

Further, as the crank radius R of the crank shaft 32 is discretely changed (increased in this instance) from $R_{min}$ to $NR_{inc}$ by the speed ratio change means, the stroke S of the sliding rack 22 is correspondingly, discretely varied to $NS_{min}$ so that S will continue to be equal to 2 R and one complete stroke of the rack 22 will rotate the output shaft 30 through 180°. For example, if R is increased to 2 $R_{inc}$, then S is correspondingly, automatically increased to 2 $S_{min}$ by operation of the output shaft 30 having the flywheel 44 connected thereto for uni-directional rotation and by operation of the scotch yoke 4 and the sliding pin 8, which can rotate the intermediate crank shaft 10 in either direction in response to a stroke of a sliding rail 2. Particularly, as R is increased to 2 $R_{inc}$, the scotch yoke 4 and the sliding pin 8 will rotate the intermediate crank shaft 10 in a single direction for four strokes of the sliding rail 2 to increase a stroke S of the sliding rack 22 to 2 $S_{inc}$ for rotating the output shaft 30 through 180° in one direction; and then the scotch yoke 4 and the sliding pin 8 will rotate the intermediate crank shaft 10 in the opposite direction for four strokes of the sliding rail 2 moving the sliding rack 22 with a stroke $S=2S_{min}$ in the opposite direction which again rotates the output shaft 30 through another 180° in the opposite direction. The presence of the flywheel 34 on the output shaft 30 assures that the output shaft 30 always rotates in a single direction, and thus also assures that the sliding rack 22 will continue to move with a stroke $S=2R$ necessary for rotating the output shaft 30 through 180°. In this instance, where $R=2R_{inc}$, the speed ratio between the speeds of the intermediate crankshaft 10 and the output shaft 30 is 4 because the crankshaft 10 is rotated through four full rotations (720° in a first direction and then 720° in the opposite direction) for 360° rotation of the output shaft 30.

According to another important aspect of the present invention, the means 26 for adjusting the effective length of the crank radius R of the crank arm 32 is carefully controlled so as to effect an increment of variation of the crank radius R beginning and ending at deadpoints in the rotatin of the crank arm 32 so as to maintain synchronization between the input means (sliding rail 2) and the output means (output shaft 30 and crank arm 32), as so that the power output of the transmission apparatus will not be interrupted. More particularly, the means 26 will preferably effect increments of variation of R beginning as the sliding rack 22 begins a stroke S, will extend through the stroke S and will end as the stroke S ends. An increment of variation is preferably equal to $R_{inc}$. Additionally, the speed ratio change means 26 will also preferably include another sensor for detecting when the crank arm 32 is in position corresponding to a deadpoint of sliding rail 22, the output of which sensor will also be received by the control unit 46.

The above-discussed preferred embodiment of the present invention, in which the motion transmitting means rotaes the output shaft 30 through one complete rotation for N complete cycles of the sliding rail 2 and in which the speed ratio change means effects increments of variation of the crank radius R beginning and ending at deadpoints in the rotation of the crank arm 32, is very desirable/advantageous because it provides a smooth power transfer from the input means to the output means without interruption of the power. Further, because the transmission apparatus according to the present invention includes a single torque transmitting path for all speed ratios thereof it is relatively compact and simple in construction, and because it does not include any conventional friction components (such as clutches, synchronizers, manual couplers, CVT pulleys, etc.) it is very efficient in power transfer.

Figure 3:
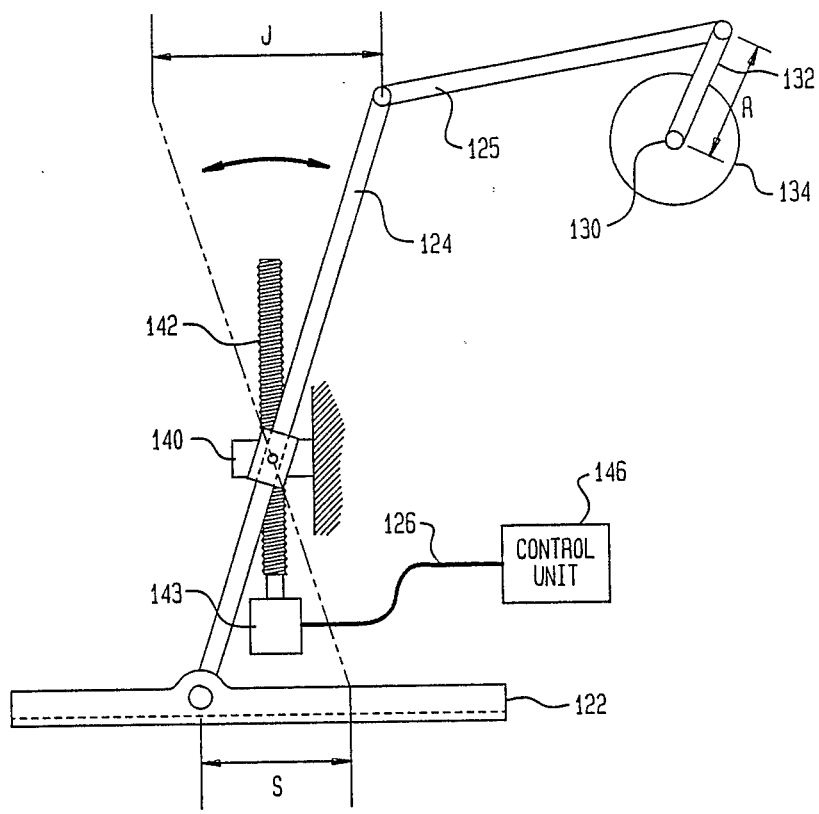
FIG. 3 depicts a modification to one portion of the preferred embodiment shown in FIGS. 1 and 2.

Referring to FIG. 3, there is shown a modification to one portion of the preferred embodiment shown in FIGS. 1 and 2. Particularly, FIG. 3 shows a modified output means, a modified connection between the motion transmitting means and the output means, and a modified speed ratio change means for the transmission apparatus according to the present invention. Note, the input means and those portions of the motion transmitting means between the input means and a sliding rack will be identical to the components shown in FIGS. 1-2, but are not shown in FIG. 2. In this modification the modified output means includes an output shaft 130, a flywheel 134 mounted about the output shaft 130 for assuring steady, unidirectional rotation of the output shaft, and a crank arm 132 having a constant crank radius R. Further, the modified motion transmitting means includes a sliding rack or energy connecting element 122 which is driven with a selectively, discretely variable stroke S by the input means, a first connecting rod 124 having one end pivotally connected to the sliding rack 122 and having an intermediate portion pivotally secured by the speed ratio change means (as discussed further below), and a second connecting rod 125 pivotally connected between an opposite end of the first connecting rod 124 and a free end of the crank arm 132. Finally, the modified speed ratio change means includes an adjustable pivot or fulcrum 140 which supports an intermediate portion of the first connecting rod 124 and a means 126 for discretely adjusting the position of the fulcrum 140, which also varies the stroke S of the sliding rack 122.

More particularly, the means 126 will preferably include a threaded shaft 142 operatively engaged with the adjustable fulcrum 140, an actuator 143 such as an electric motor having an output shaft thereof axially connected to the threaded shaft 142 so that the motor will discretely rotate the threaded shaft 142 to discretely adjust the position of the fulcrum 140, and a control unit 146 such as a microporcessor which will control discrete operation of the actuator 143 in a predetermined manner similar to that discussed above in relation to the control unit 46 controlling discrete operation of the hydraulic system in the preferred embodiment of FIGS. 1 and 2.

In FIG. 3, the operative crank radius R of the crank arm 132 is constant, and the crank arm is uni-directionally driven by a constant, reciprocating stroke J of the pivot connection between the first and second connecting rods 124, 125 (a first stroke J of the pivot connection drives the crank arm 132 and the output shaft 130 through 180° of rotation in a given direction, and the reciprocal stroke J of the pivot connection drives the crank arm and the output shaft a further 180° in the same direction). As with the preferred embodiment, the stroke J of the pivot connection is rendered constant by the presence of the flywheel 134 on the output shaft 130. Further, as the lower end of the first connecting rod 124 is driven back and forth with the variable stroke S of the sliding rack 122, the upper end of the connecting rod 124 is correspondingly driven back and forth with the constant stroke J, and the length of the variable stroke S necessary to drive the pivot connection by the constant stroke J is dependent on the position of the adjustable fulcrum 140 along the length of the connection rod 124. More particularly, appropriate positions of the adjustable fulcrum 140 along the connecting rod 124 will be predetermined such that the variable stroke S will always be equal to $NS_{min}$, again N=1,2,3 etc., and the output shaft 130 will be driven through one complete rotation (360°) for N complete cycles of the sliding rail of the input means (not shown in FIG. 3); and the speed ratio change means will discretely change the position of the adjustable fulcrum 140 in increments of variation beginning and ending at points in rotation of the crank arm 132 corresponding to dead points of sliding rail 122 so that there will be a smooth, constant power flow to the output shaft of 130.

Figure 4:
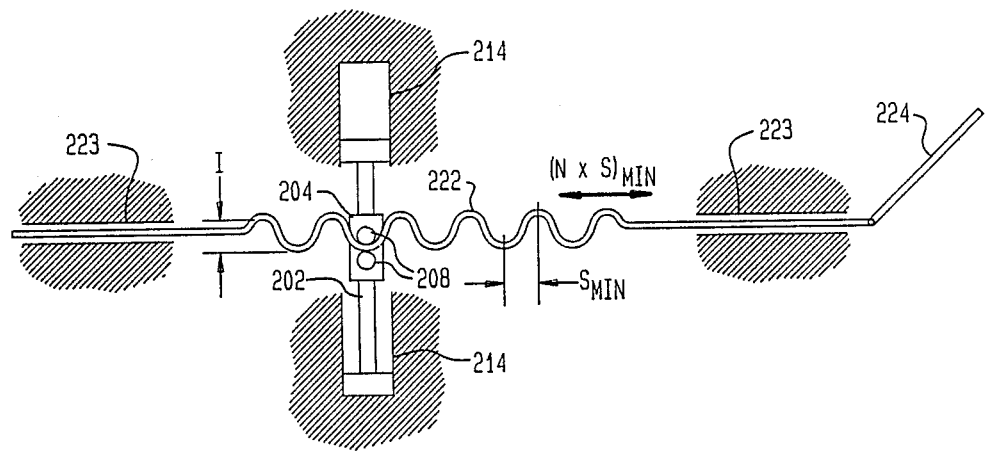
FIG. 4 depicts a modification to another portion of the preferred embodiment shown in FIGS. 1 and 2.

Referring to FIG. 4, there shown another modification to the preferred embodiment of the invention shown in FIGS. 1 and 2. In this modification, the motion transmitting means is completely different from that shown in FIGS. 1 and 2 except for the final connecting rod 224 which connects the motion transmitting means to the crank arm of the output means. The input means, the output means and the speed ratio change means according to this modified embodiment are identical to that shown in FIGS. 1 and 2. The modified motion transmitting means includes: a sliding or energy connecting element 222 having a central, sinusoidally-shaped portion and flat end portions which slidably engage respective guide members 223; a roller guide 204 provided on a sliding rail 202 of the input means for being reciprocatingly driven by the input means with a constant stroke I, and including a pair of rollers 208 engaging opposite surfaces of the central portion of the sliding element 222; and the connecting rod 224 which is pivotally connected between the sliding element 222 and the crank arm of the output means (not shown) for rotatively driven an output shaft of the output means. In operation, reciprocating movement of the sliding rail 202 of the input means together with the roller guide 204 will force the rollers 208 of the roller guide 204 to slidingly move the element 222. In a manner substantially similar to that discussed above in relation to the preferred embodiment shown in FIGS. 1 and 2 each full storke I of the sliding rail 202 will force the roller guide 204 to move the sliding element 222 by a given increment $S_{min}$ (in this case the longitudinal distance between a peak and an adjacent valley in the sinusoidally-shaped central portion of the element 222). Also the beginning and ending deadpoints of each stroke I of the sliding rail 202 will exactly coincide with the rollers 208 of the roller guide 204 engaging a peak or a valley of the central portion of the sliding element 222, $S_{min}$ of the sliding element 222 will be directly related to the crank radius R of the crank arm of the output means and to the variable stroke S of the sliding element 222 so that the output shaft of the output means will be driven through one complete rotation for N complete cycles of the sliding rail 202 of the input means, and an increment $R_{inc}$ of adjustment of the crank radius R of the crank arm of the output means will be effected beginning and ending at poins of rotation of the crank arm corresponding to the deadpoints of sliding element 222 so as to maintain synchronization of the transmission apparatus and to assure smooth, constant power output of the transmission apparatus.

The modifications presented in FIGS. 3 and 4 of the present invention achieve the same advantages as discussed above in relation to the embodiment shown in FIGS. 1 and 2.

Although there has been described what is at present considered to be the preferred embodiment of the invention, it will be understood that the invention can be embodided in other specific forms without departing from the spirit or essential characteristics thereof. For example, the hydraulic system of the speed ratio change means discussed above in relation to FIGS. 1 and 2 could be replaced with a mechanical arrangement of a threaded shaft radially located on the crank arm 32 and a nut selectively movable along the threaded shaft and carrying a pivotal coupling such as coupling 40. The variation of crank radius would be achieved through discrete rotation of the threaded shaft. The present embodiment is, therefore, to be considered in all aspects as illustrative, and not restrictive. The scope of the invention is indicated by the appended claims rather than by the foregoing description.

I claim:

1. A multiple speed ratio power transmission apparatus, comprising:
   input means adapted to be connected to a power source for being driven with a constant reciprocating or oscillating motion;
   output means including a rotatable output shaft;
   motion transmitting means for controllably coupling said input means to said output means;
   said motion transmitting means including an energy connecting element drivably connected to said input means so as to be driven into a reciprocating or oscillating motion with a selectively, discretely variable stroke $S=NS_{min}$, where $S_{min}$ is an increment of movement of the energy connecting element corresponding to one complete motion of the input means and N=1,2,3, etc. indicating a selectively variable number of complete motions of said input means;
   said energy connecting element being drivably connected to the output shaft for driving the output shaft through 180° rotation with each stroke S thereof;
   said motion transmitting means being adapted to move in either of opposite directions when said input means is in deadpoints of its motion and deadpoints in the reciprocating or oscillating motion of said energy connecting element being synchronized with said deadpoints in the motion of said input means; and
   speed ratio change means operatively associated with said motion transmitting means for selectively, discretely varying the stroke S of said energy connecting element to thereby change a speed ratio between said motion of said input means and rotation of said output shaft.

2. Transmission apparatus according to claim 1, wherein:
   said input means comprises a sliding rail adapted to be connected to said power source for being driven with a constant reciprocating stroke I; and said motion transmitting means comprises a scotch yoke fixed to said sliding rail and having a slot defined therein in perpendicular relation to a longitudinal axis of the sliding rail, a crank pin freely sliding in the slot and having a crank arm and a crank shaft connected thereto for being rotated by reciprocating movements of said sliding rail.

3. Transmission apparatus according to claim 2, wherein:
a crank radius L of said crank arm is equal to ½ I, whereby one stroke I of said sliding rail will cause the crank shaft to rotate 180° in either of opposite directions.

4. Transmission apparatus according to claim 1, wherein:
said energy connecting element of said motion transmitting means is a rack; and
said motion transmitting means further includes a pinion meshing with said rack and drivable by said crank shaft.

5. Transmission apparatus according to claim 1, wherein:
said output means further includes a crank arm fixed on to said output shaft, the crank arm having a discretely adjustable crank radius R;
said speed ratio change means includes means for selectively, discretely adjusting the crank radius R such the $R=NR_{inc}$, where $R_{inc}$ is a predetermined increment length of the crank radius R and $N=1,2,3$, etc.;
said selectively, discretely variable stroke S of said energy connecting element is variable with the crank radius R of said crank arm so that $S=2R$ at all times.

6. Transmission apparatus according to claim 5, wherein:
said motion transmitting means further includes a connecting rod pivotally coupled between said energy connecting element and said crank arm; and
said means for discretely varying the length of said crank arm comprises and adjustable pivotal coupling between said connecting rod and said crank arm, and means for discretely moving said pivotal coupling radially along said crank arm.

7. Transmission apparatus according to claim 6, wherein:
said means for discretly moving said pivotal coupling radially along said crank arm is adapted to discretely move the pivotal coupling in increments of $R_{inc}$.

8. Transmission apparatus accordingly to claim 5, wherein:
said means for discretely adjusting the crank radius R of said crank arm is adapted to effect an increment of variation within 180° rotation of the crank arm beginning and ending at deadpoints in the motion of said energy connecting element.

9. Transmission apparatus according to claim 1, wherein:
said output means further includes a flywheel mounted about the output shaft for assuring unidirectional rotation of the output shaft.

10. Transmission apparatus according to claim 1, wherein:
said output means further includes a crank arm fixed on said output shaft;
said motion transmitting means further includes a first connecting rod having one end pivotally coupled to said energy connecting element, and a second connecting rod pivotally connected between said first connecting rod and said crank arm; and
said speed ratio change means comprises an adjustable pivot supporting an intermediate portion of said first connecting rod such that opposite ends of the first connecting rod can move-back-and-forth about the adjustable pivot, and means for moving said adjustable pivot longitudinally along said first connecting rod in discrete increments.

11. Transmission apparatus according to claim 10, wherein:
said means for moving said adjustable pivot includes a threaded shaft connected to said adjustable pivot, a motor rotatably coupled to said threaded shaft and a control means for controlling actuation of the motor.

12. Transmission apparatus according to claim 1, wherein:
said input means comprises a sliding rail adapted to be connected to said power source for being driven with a constant reciprocating stroke I;
said energy connecting element of said motion transmitting means includes a central, sinusoidally shaped section; and
said motion transmitting means includes a roller guide connected to said sliding rail for being driven therewith, said roller guide including a plurality of rollers drivably engaging opposite surfaces of said central, sinusoidally shaped section of the energy connecting element.

13. A power unit comprising:
an internal combustion engine having at least one piston;
input means adapted to be connected to a power source for being driven with a constant reciprocating or oscillating motion;
out means including a rotatable output shaft;
motion transmitting means for controllably coupling said input means to said output means;
said motion transmitting means including an energy connecting element drivably connected to said input means so as to be driven into a reciprocating or oscillating motion with a selectively, discretely variable stroke $S=NS_{min}$, where $S_{min}$ is an increment of movement of the energy connecting element corresponding to one complete motion of the input means and $N=1,2,3$, etc. indicating a selectively variable number of complete motions of said input means;
said energy connecting element being drivably connected to the output shaft for driving the output shaft through 180° rotation with each stroke S thereof;
said motion transmitting means being adapted to move in either of opposite directions when said input means is in deadpoints of its motion and deadpoints in the reciprocating or oscillating motion of said energy connecting element being synchronized with said deadpoints in the motion of said input means; and
speed ratio change means operatively associated with said motion transmitting means for selectively, discretely varying the stroke S of said energy connecting element to thereby change a speed ratio between said motion of said input means and rotation of said output shaft.

* * * * *